Alastair William Rodney Allcock
Inventor

United States Patent Office 3,447,763
Patented June 3, 1969

3,447,763
FLAP SYSTEMS FOR AIRCRAFT
Alastair William Rodney Allcock, Northwood, England, assignor to Power Jet (Research and Development) Limited, London, England
Original application Oct. 21, 1965, Ser. No. 499,239, now Patent No. 3,355,125, dated Nov. 28, 1967. Divided and this application Aug. 17, 1967, Ser. No. 669,340
Claims priority, application Great Britain, Dec. 11, 1964, 50,618/64
Int. Cl. B64c *3/48, 9/02*
U.S. Cl. 244—42   3 Claims

ABSTRACT OF THE DISCLOSURE

An aircraft wing flap in which air is blown over the upper surface from a nozzle located in the wing to which the flap is attached, said flap being provided with a discontinuity in its surface which acts to separate flow over the flap to cause drag and loss of lift. The discontinuity, which may be in the form of a step, is shrouded by the wing trailing edge during the normal range of flap operation, and becomes exposed only when the flap is turned beyond this range.

In one variation, the discontinuity is associated with a passage extending through the flap from its nose to its undersurface.

---

This application is a division of applicant's copending application Ser. No. 499,239, filed Oct. 21, 1965, now Patent No. 3,355,125.

The present invention relates to flap systems for aircraft and in particular aircraft in which provision is made for discharging gaseous fluid rearwardly as long thin streams along the span of the wings or other lifting surfaces in such a way as to modify the pressure distribution around the surfaces.

Such aircraft include those fitted with blown flaps and those operating on the "jet flap" principle. In the former case air is blown over a surface of a flap to entrain the airflow over the surface and increase the lift obtainable by reducing the possibility of aerodynamic flow breakaway when the flap is deflected.

In a jet flap aircraft a propulsion jet stream is discharged over the upper surface of a trailing edge wing flap disposed to guide the jet stream on a path following said upper surface and moveable to deflect the stream from the rearward direction. The stream will not only thus produce forward thrust but will have an effect analogous to that of a conventional trailing edge wing flap and give rise to a substantial increase in wing lift. Examples of jet flap aircraft are disclosed in prior British patent specifications 787,012, 787,013 and 921,013.

A jet or blown flap when in a neutral (or up) position generally has low drag and when in the deflected position tends to develop lift. These are undesirable characteristics after landing or after abandonment of take-off, particularly if still subjected to air or gas flow, which additionally is likely to produce a substantial thrust, since they militate against rapid deceleration of an aircraft.

The invention is directed to a flap system which can be arranged to produce high drag and low lift.

A flap system according to the invention comprises a flap mounted for movement relative to a lifting surface, a discontinuity in the surface of the flap and means for shielding the discontinuity from fluid flow over the flap.

In a preferred form of the invention the system further comprises a nozzle arranged to direct a fluid stream over the flap.

According to a feature of the invention the discontinuity may be exposed to fluid flow by movement of the flap.

An embodiment of the invention will now be described by way of example with reference to the accompanying diagrammatic drawings of which:

Figure 1:
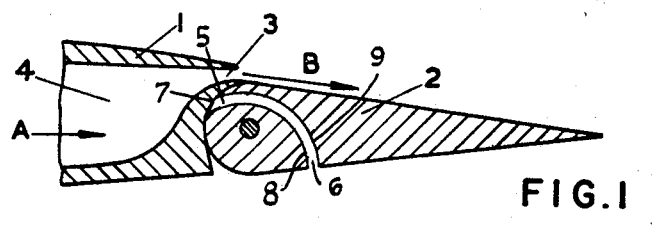
FIGURE 1 is a sectional view of part of an aircraft wing with a flap attached in the neutral position.

Referring to FIGURE 1, an aircraft wing 1 has flap 2 pivoted behind its trailing edge so that the flap when in a neutral position as shown forms in effect a rearward extension of the wing. The trailing edge of the wing is shaped to enclose the nose of the flap and act as a shroud.

The upper surface of the wing is spaced above that of the flap to form a rearwardly directed nozzle 3 extending along the span of the wing and connected to an internal duct 4 to which compressed air is supplied from a suitable source.

It is envisaged that the invention might be applied to a jet flap aircraft as described in the previously mentioned prior specification No. 921,013 in which case the source of compressed air would be the by-pass compressors of the jet propulsion engines used therein.

Air flowing through the duct in the direction of the arrow A is discharged from the nozzle as a narrow stream over the upper surface of the flap as indicated by arrow B.

When the flap is turned about its pivot the air stream will continue to flow over the upper surface of the flap and will be deflected from the rearward direction thus modifying the circulation around the wing.

The nose of the flap is formed with an opening 5 which extends along the span of the flap and interrupts the otherwise continuous flap surface. The opening 5 communicates with an internal passage 6 defined by walls 8, 9 and which extends through the flap to its undersurface. The wall 8 merges smoothly into the contour of the flap nose while the wall 9 meets the flap surface at an acute angle to define therewith a lip 7.

The opening 5 is so situated that it will be shielded by the wing shroud when the flap is in the neutral position or until turned downwards to a desired angle, say about 60°, corresponding to the normal range of flap operation.

At flap angles of this order, the effect of nozzle flow is to energize the boundary layer of the normal aerodynamic flow over the wing whereby laminar flow will be maintained over the flap surface.

This relies on Coanda effect wherein surface continuity is a critical factor.

Figure 2:
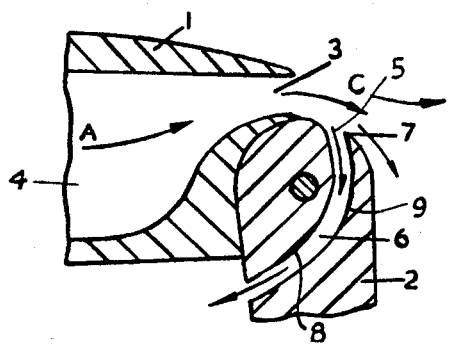
FIGURE 2 is another view showing the flap in a deflected position.

Flap movement beyond the normal range exposes the lip 7 and the opening 5 to the nozzle stream, as shown in FIGURE 2, with the result that flow separation over the surface of the flap is induced.

Initial separation occurs due to the lip diverting part of the nozzle flow into the passage 6, causing a reduction in its effect on the boundary layer, and the discontinuity in the flap surface occasioned by the opening 5 results in a breakdown of Coanda effect and virtual loss of boundary layer control normally effected by the nozzle flow.

Additionally, there will be fluctuations in the mass flow into the passage 6 due to choking, leading to flow reversal around the lip 7 and hence a destabilizing action on flow over the flap surface.

The turbulent flow induced is a considerable source of drag in itself, while the reduction of lift on the flop causes the latter to act as an air brake. The over-all lift reduction also increases the effectiveness of normal wheel braking. Additionally, the airflow diverted through the passage 6 disrupts the underwing aerodynamic flow as well as giving a measure of reversed thrust.

The exposing of the opening 6 and the lip 7 occurs only beyond the normal range of flap operation and some flap control limitation capable of being overcome only when desired would be provided. Certain prior specifications, including Nos. 787,012 and 787,013, relate to jet flap aircraft in which turbine efflux is directed over a flap in place of compressed air as aforementioned. In an application of the present invention to these cases it might be desirable that the flap be constructed in accordance with prior British patent specification No. 904,788.

I claim:

1. A flap system for an aircraft having an aerofoil comprising a flap pivoted behind the trailing edge of the aerofoil, the upper surface of the aerofoil being raised relative to that of the flap to define a rearwardly directed nozzle extending spanwise along the trailing edge of the aerofoil; a connection between the nozzle and a fluid pressure source; a flow channel extending through said flap; and a lip formed in the surface of the leading edge of said flap, and adapted during a predetermined range of flap angles to separate fluid flow discharged by the nozzle into a path passing over said flap and into a path passing through said channel, to disrupt underwing flow.

2. A flap system according to claim 1, wherein during another predetermined range of flap angles, said trailing edge of said aerofoil closes off flow through said channel and the upper surface of said flap is exposed both to normal aerodynamic flow and to fluid flow discharged by the nozzle.

3. A flap system according to claim 1, wherein during said predetermined range of flap angles, said lip initiates aerodynamic separation of the normal aerodynamic flow over said aerofoil.

References Cited

UNITED STATES PATENTS

| | | | |
|---|---|---|---|
| 1,422,616 | 7/1922 | Page | 244—42 |
| 1,945,254 | 1/1934 | Bittner | 244—42 |

MILTON BUCHLER, *Primary Examiner.*

J. L. FORMAN, *Assistant Examiner.*